J. G. TENNENT.
ATTACHMENT FOR MOTOR VEHICLES.
APPLICATION FILED JUNE 17, 1921.
1,418,034.                                Patented May 30, 1922.
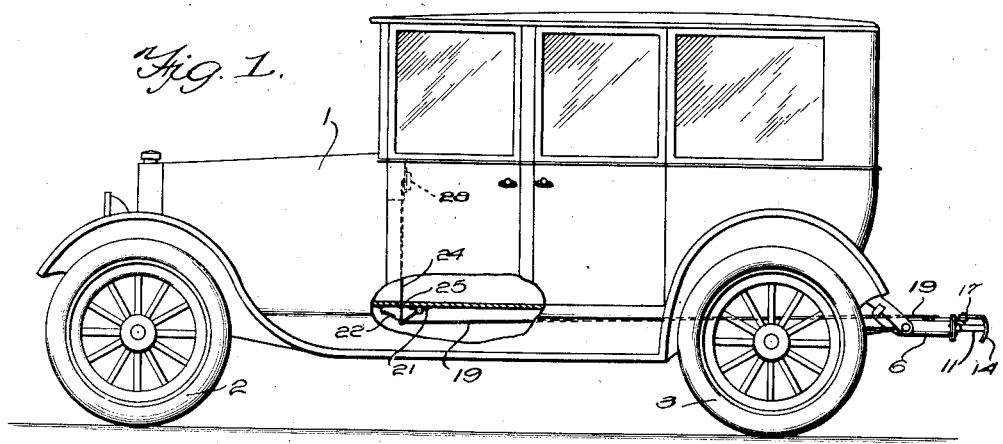
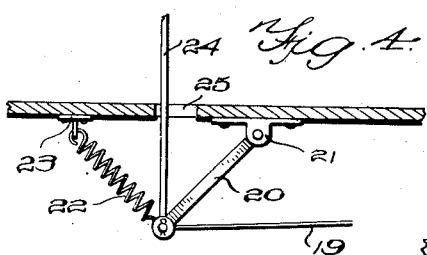
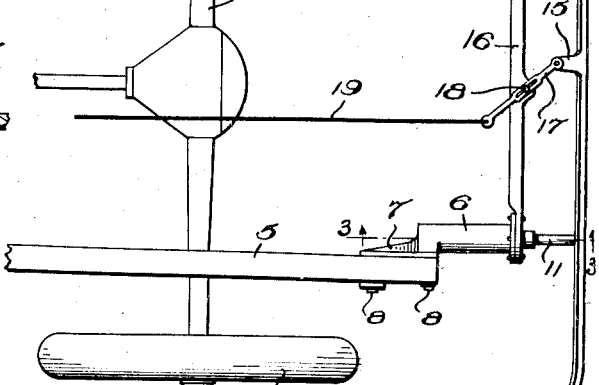
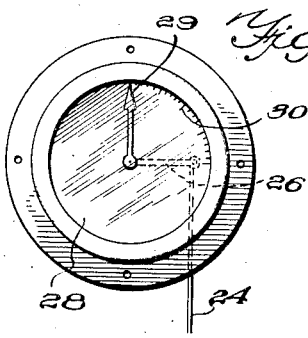
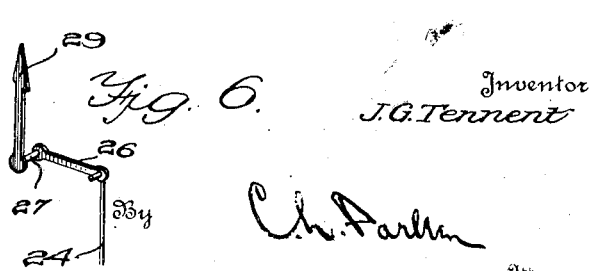
Inventor
J. G. Tennent
Attorney

UNITED STATES PATENT OFFICE.

JOHN GRANVILLE TENNENT, OF DALLAS, TEXAS.

ATTACHMENT FOR MOTOR VEHICLES.

1,418,034. Specification of Letters Patent. Patented May 30, 1922.

Application filed June 17, 1921. Serial No. 478,290.

*To all whom it may concern:*

Be it known that I, JOHN GRANVILLE TENNENT, a citizen of the United States residing at Dallas, in the county of Dallas and State of Texas, have invented certain new and useful Improvements in Attachments for Motor Vehicles, of which the following is a specification.

This invention relates to attachments for motor vehicles, and it comprises an indicator arranged at a convenient point on the vehicle and an actuating member connected thereto, said actuating member being arranged at the rear of the car.

An object of the invention is the provision of means for indicating when a vehicle comes in contact with another object when moving rearwardly.

When a car is being "backed," or run in a reverse direction, it is necessary for the driver to operate the steering wheel and other mechanism arranged in front of him, and to watch the rear end of the car to see that it does not collide with other machines or other obstacles. It is very difficult at times to drive the machine and, at the same time, watch the rear end, and this is especially true when driving a closed car.

When a machine is "parked" parallel to the curb of the street and other machines are parked along the same street, it is generally necessary to drive the car rearwardly as far as possible and then forwardly in order to clear the rear end of another machine parked in front of the vehicle. When the vehicle approaches another vehicle parked in the rear, the indicator registers and warns the driver, at the same time indicating the distance the machine may still be moved without collision.

The device is further useful in preventing the rear portion of a machine, extending beyond the rear wheels, from contacting with lamp posts, fences and the like, when the machine is backed against a curb and the rear portion thereof projects over the curb.

In the accompanying drawings, I have shown one embodiment of the invention. In this showing:

Figure 1 is a side elevation of a vehicle showing the invention applied,

Figure 2 is a plan view of a portion of a frame of a vehicle,

Figure 3 is a detail sectional view on line 3—3 of Figure 2,

Figure 4 is a detail view of a portion of the attachment,

Figure 5 is a front elevation of the indicating dial, and,

Figure 6 is a detail view of the indicator hand or pointer.

Referring to the drawings, the reference numeral 1 designates generally a motor vehicle provided with front wheels 2, and rear wheels 3. The rear wheels are mounted on an axle arranged in an axle housing 4, and the body of the vehicle is supported on the frame including longitudinal bars 5. A pair of cylinders 6 are supported on any suitable part of the machine, at the rear thereof. As shown, the cylinders are provided with webs or extensions 7, adapted to receive bolts 8, passing through the longitudinal bars of the frame. The outer ends of the cylinders are provided with cylinder heads 9, having a boss or extension 10. The extension is provided with a central bore for the reception of a piston rod 11, carrying a piston 12 arranged within the cylinder. A spring 13 normally retains the piston in its outer position. A cross bar or bumper 14 is secured to the outer ends of the piston rods and this bumper is provided with a lug or projection 15, arranged intermediate the piston rods. A rigidly mounted cross bar 16 is arranged substantially parallel to the bumper 14. A link 17 is secured to the lug or projection 15 and is pivotally mounted on the cross bar, as at 18. A flexible connecting member 19, such as a rope or cable is secured to the other end of the link, the connecting element extending beneath the floor of the car and being connected to an arm 20, pivotally mounted in a bracket 21. A spring 22 is secured to the arm to normally retain it in forward position, the other end of the spring being secured to the floor of the car, as at 23. A connecting member 24 extends upwardly through a slot 25 in the floor of the car. This member is connected to a crank or arm 26, mounted on a shaft 27 arranged in an indicator 28. A hand or pointer 29 is mounted on the shaft 27 and this pointer is adapted to co-operate with suitable indicia 30, arranged on the face of the indicator.

In operation, the car is moved in a reverse direction, and when the bumper 14 engages an obstacle, the flexible element 19 is moved rearwardly by the inward movement of the bumper, swinging the arm 20 on its pivot. This movement is communicated to the connecting member 24, turning the pointer 29 and indicating the engagement of the bumper with an obstacle. When the car is moved away from the obstacle, the springs 13 and 22 return the parts to normal position. As the length of the piston rods 11 may be ascertained and the amount of movement of the bumper 14 with respect to the car thus known, the distance that the car may be moved after the bumper engages an obstacle, may be known by the operator and this distance may be gaged by the movement of the pointer.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A vehicle attachment comprising a movable member arranged at the rear of the vehicle, said member being adapted to be moved by engagement with an obstacle, an indicator mounted adjacent the driver's seat of the vehicle to indicate the engagement of said movable member with an obstacle, and connections between said movable member and said indicator to operate the latter upon movement of said member.

2. A vehicle attachment comprising a cylinder mounted at the rear of the vehicle, a plunger arranged in said cylinder, means for normally retaining said plunger in its outer position, a bumper carried by said plunger, an indicator mounted adjacent the driver's seat of the vehicle to indicate the engagement of said movable member with an obstacle, and connections between said indicator and said bumper to operate said indicator upon movement of the bumper.

3. A vehicle attachment comprising a plurality of cylinders mounted on a vehicle, plungers arranged in said cylinders, means for normally retaining said plungers in outer position, a bumper secured to said plungers, a variable indicator arranged on the vehicle, and a flexible element connecting said bumper and said indicator to indicate the movement of the bumper.

4. A vehicle attachment comprising a pair of cylinders arranged at the rear of the vehicle, a plunger mounted in each of said cylinders, means for normally retaining said plungers in outer position, a bumper carried by said plungers, a cross bar mounted between said cylinders, a link mounted on said cross bar and provided with a slot, said cross bar being provided with a pin engaging within said slot, one end of said link being pivotally connected with said bumper, an indicator mounted adjacent the driver's seat of the vehicle, and means connected between said indicator and the other end of said link for operating said indicator upon movement of said bumper.

5. A vehicle atachment comprising an inwardly movable bumper arranged at the rear of the vehicle, means for maintaining said bumper in outer position, an arm pivoted beneath the floor of said vehicle adjacent the driver's seat, an actuating member connected between said bumper and the free end of said arm, an indicator mounted adjacent the driver's seat of the vehicle, and a connecting member mounted between said indicator and the free end of said arm.

6. A vehicle attachment comprising an inwardly movable bumper arranged at the rear of the vehicle, means for maintaining said bumper in outer position, an arm pivoted beneath the floor of said vehicle adjacent the driver's seat, an actuating member connected between said bumper and the free end of said arm, an indicator mounted adjacent the driver's seat of the vehicle, a connecting member mounted between said indicator and the free end of said arm, and means connected between said arm and the floor of the vehicle for normally maintaining said indicator in zero position.

In testimony whereof I affix my signature in presence of two witnesses.

JOHN GRANVILLE TENNENT.

Witnesses:
 CHAS. J. WEST,
 C. G. MORGAN.